United States Patent
Horner

(10) Patent No.: US 6,302,011 B1
(45) Date of Patent: Oct. 16, 2001

(54) OUTPUT PUSH ROD AND SPRING RETAINER

(75) Inventor: Charles Byron Horner, South Bend, IN (US)

(73) Assignee: Robert Bosch Corporation, Broadview, IL (US)

(*) Notice: Subject to any disclaimer, the term of this patent is extended or adjusted under 35 U.S.C. 154(b) by 0 days.

(21) Appl. No.: 09/819,043

(22) Filed: May 30, 2000

(51) Int. Cl.$^7$ .................................................... F15B 9/10
(52) U.S. Cl. ................................................................. 91/369.2
(58) Field of Search ................................. 91/374, 376 R, 91/387; 60/533, 547.1, 568

(56) References Cited

U.S. PATENT DOCUMENTS

| | | | |
|---|---|---|---|
| 3,357,317 | * 12/1967 | Hager | 91/391 R |
| 4,069,742 | * 1/1978 | Gephart et al. | 91/369.2 |
| 4,665,802 | * 5/1987 | Barker et al. | 60/533 X |
| 4,766,804 | * 8/1988 | Barker | 60/533 X |
| 4,882,980 | * 11/1989 | Arino et al. | 91/369.2 X |
| 5,002,169 | * 3/1991 | Barker | 60/568 X |
| 5,249,505 | * 10/1993 | Hewitt | 91/376 R |

* cited by examiner

*Primary Examiner*—John E. Ryznic
(74) *Attorney, Agent, or Firm*—Leo H McCormick, Jr.; Warren Comstock

(57) ABSTRACT

A brake booster (12) having a housing (14,16) with a control valve (70) located in an axial bore (54) of a hub (50) carried by a movable wall (22,24). The movable wall (22,24) separates the interior of the housing into a first chamber (26,26') and a second chamber (28,28'). The control valve (70) in a first mode communicates the first chamber (26,26') with the second chamber (28,28') to provide for equal pressures therein and in a second mode communicates the second chamber (28,28') with a surrounding environment to create a pressure differential across the movable wall (22, 24). A reaction member (96) carried by the movable wall (22,24) communicates an operational force created by the pressure differential into an output push rod (94). After the operational force overcomes a return spring (130,130'), the output push rod (94) moves pistons (200) in a master cylinder (202) to correspondingly pressurize fluid therein which is supplied to wheel brakes to effect a brake application. The brake booster (12) is characterized by a retainer (100) having a base (102) with an axial opening (104) and a plurality of axial legs (106,106' ... 106") which extend from the base (102). With the base (102) located in the axial bore (54) a shaft (91) of the output push rod (94) passes through the axial opening (104) while the plurality of axial legs (106,106' ... 106") are located in corresponding a plurality of arcuate and axial slots (82,82' ... 82") in the hub (50) located on the peripheral surface of the axial bore (54). The plurality of axial legs (106,106') frictionally engage the hub (50) to position the base (102) in the axial bore (54) such that the head (92) of the output push rod (94) is positioned adjacent the reaction member (94) and the shaft (91) is located along the axis of the axial bore (54).

16 Claims, 3 Drawing Sheets

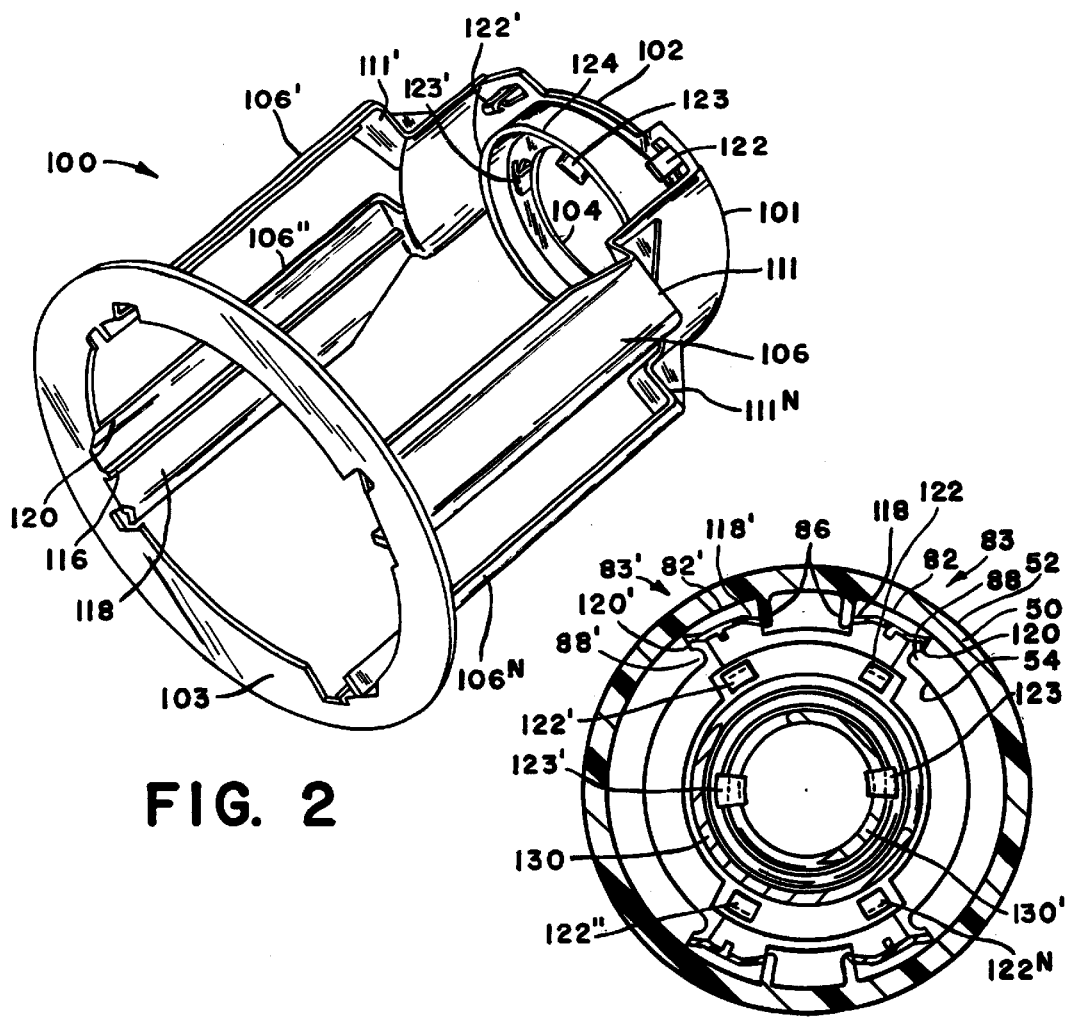
FIG. 2
FIG. 3
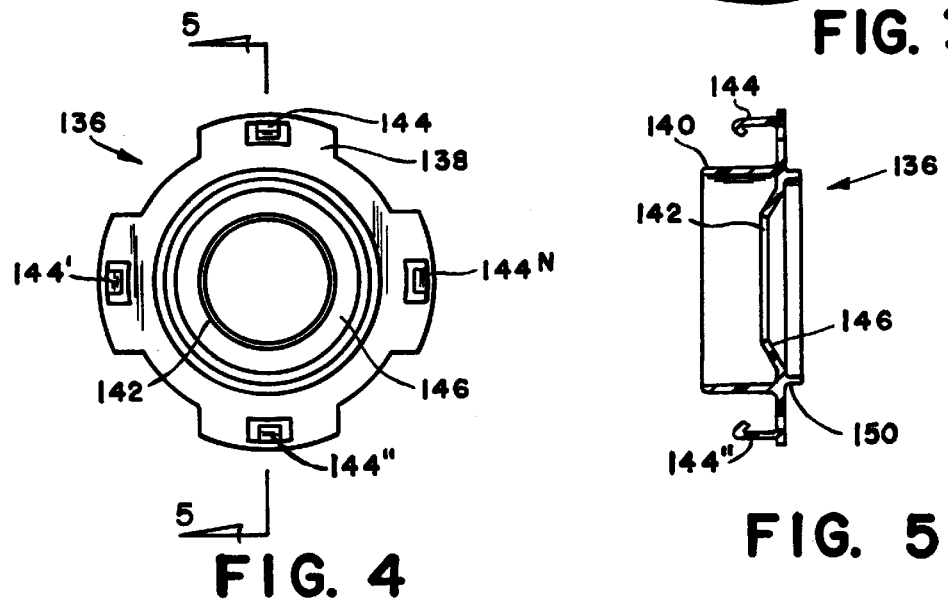
FIG. 4
FIG. 5

OUTPUT PUSH ROD AND SPRING RETAINER

This invention relates to a retainer for holding a return spring and output push rod in an axial bore of a hub of a movable wall in a vacuum brake booster.

BACKGROUND OF THE INVENTION

U.S. Pat. No. 5,233,911 discloses a typical tandem brake booster through which a force is developed to effect a brake application. In such a brake booster, corresponding first and second walls divide the interior into first and second front chambers and first and second rear chambers. The first front chamber is externally connected to a first source of fluid pressure by a conduit and internally directly connected to the second front chamber and to the first and second rear chambers by various passageways in a hub associated with the first and second walls. A control valve located in the hub is positioned such that the first fluid pressure is communicated in the first and second rear chambers through the passageways to define a rest or ready position. In responsive to an input force, the control valve is positioned such that a second fluid pressure is presented through a passageway to the first and second rear chambers to create a pressure differential across the first and second walls. This pressure differential acts on the first and second walls to develop an output force, which is provided to a master cylinder to assist in effecting a brake application. On termination of the input force, a return spring positions the control valve to a rest or ready location to define a first mode of operation where the second fluid is evacuated from the first and second rear chambers to provide for equalization of the first fluid pressure in the first and second rear chambers. This type vacuum brake booster functions in an adequate manner to provide an assist in effecting a brake application.

U.S. Pat. Nos. 4,409,885; 4,942,738; 5,313,796; 5,329,769 and 5,802,852 disclose brake booster and master cylinder arrangements wherein at least a portion of the master cylinder housing is positioned within the interior of the booster housing to define an integrated brake assembly. Such brake boosters operate in a satisfactory manner but because of their overall size occupies considerable under the hood space when installed in a vehicle. In this arrangement it is common for the brake boosters and master cylinders to manufactured in different locations and assembled as a central location. Unfortunately, the output push rod, which is considered to be part of the brake booster, must be separately shipped to the assembly location, as it is not fixed to the movable wall. U.S. Pat. Nos. 4,892,027 and 4,898,073 disclose structure, which is designed to retain an output push rod within a brake booster. However, when a housing of a master cylinder is recessed into a brake booster if the return spring is located between the shell housing and movable wall external to the hub, there is a possibility of interference between the housing of the master cylinder housing and moveable wall of the brake booster.

SUMMARY OF THE INVENTION

A primary object of the present invention is to provide structure for retaining both an output push rod and a return spring within an axial bore of a hub member associated with a movable wall of a brake booster assembly.

The brake booster has housing with an interior divided by a movable wall assembly into at least a first front chamber and at least a first rear chamber. The wall assembly has a hub with a cylindrical projection, which extends through the housing into the surrounding environment. A control valve located in an axial bore formed in the hub has a first mode of operation wherein the front chamber which is permanently connected to a first source of pressure (vacuum) is in communication with the rear chamber to provide for equal pressures therein and a second mode of operation wherein the second chamber is in communication with a surrounding environment (atmospheric pressure) to create a pressure differential across the movable wall assembly. An operational force created by a pressure differential acting on the wall assembly is communicated through a reaction member into an output push rod. After the operational force overcomes a return spring, the output push rod moves pistons in a master cylinder to pressurize fluid therein. This pressurized fluid is supplied to wheel brakes to effect a brake application. The brake booster is characterized by a retainer having a base with an axial opening and a plurality of axial legs, which extend from the base. The base is located in the axial bore with a shaft of the output push rod passing through the axial opening while the plurality of axial legs are located in corresponding a plurality of arcuate and axial slots located on the peripheral surface of the axial bore in the cylindrical body of the hub. The plurality of axial legs frictionally engage the hub to position the base in the axial bore such that a head of the output push rod is located adjacent the reaction member and the shaft and return spring are concentrically located along the axis of the axial bore.

An advantage of the brake booster resides in a retainer, which holds a return spring and output push rod in a concentric position within an axial bore of a hub connected to a movable wall.

A further advantage of resides in the manufacture of a brake booster where a return spring means and output push rod are held in an axial bore of a hub by a retainer prior to being connected to a housing of a master cylinder.

BRIEF DESCRIPTION OF THE DRAWINGS

FIG. 2 is a perspective view of a retainer which holds an output push rod and return spring in an axial bore of a hub in a movable wall assembly of the brake booster of FIG. 1;

FIG. 3 is a sectional view taken along line 3—3 of FIG. 1 showing a locking arrangement for frictionally positioning the retainer of FIG. 2 in the hub;

FIG. 4 is a front view of an end cap for use with the retainer of FIG. 2 in holding a spring arrangement in the axial bore of the hub;

FIG. 5 is a sectional view taken along line 5—5 of FIG. 4; and

DETAILED DESCRIPTION

Figure 1:
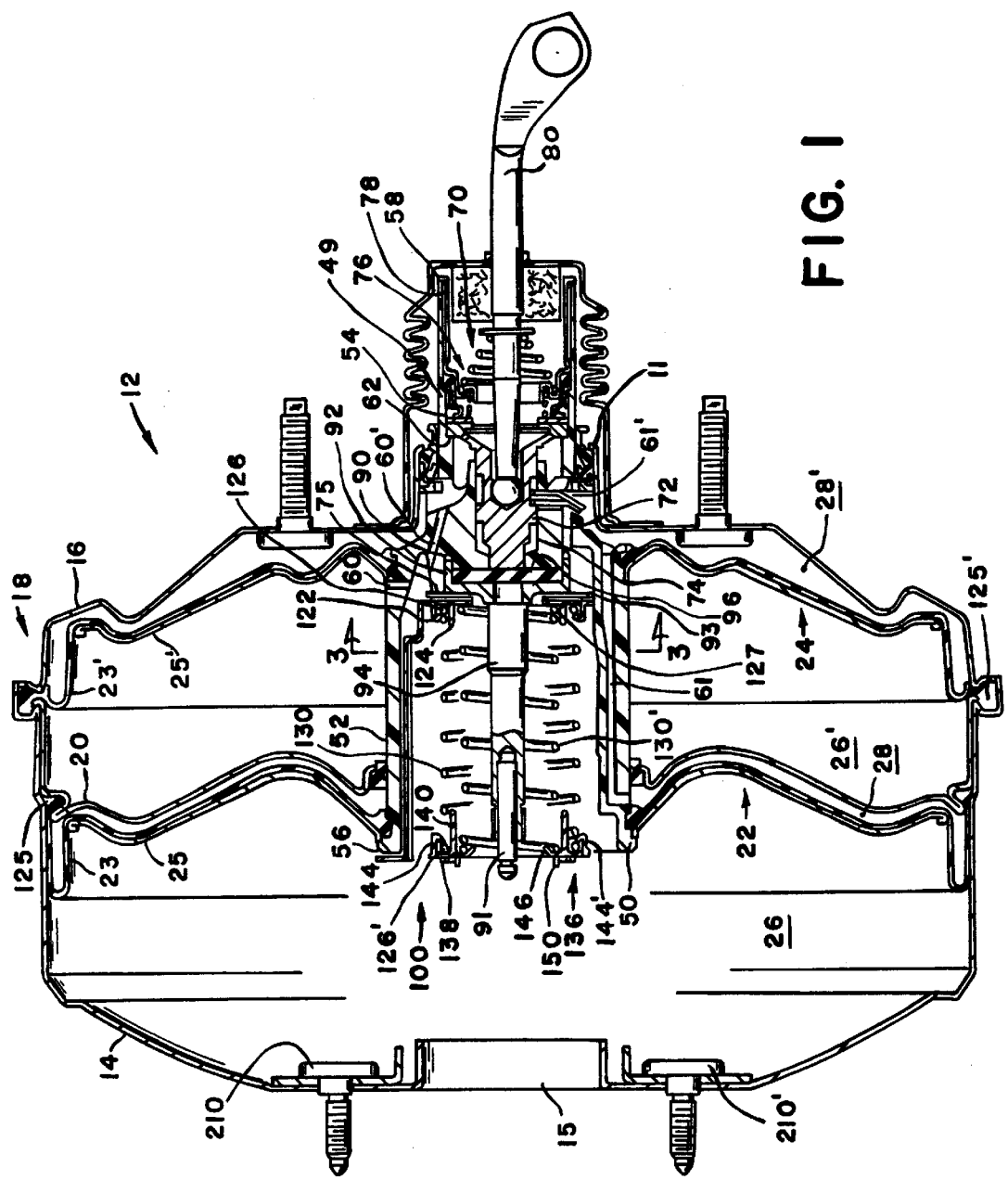
FIG. 1 is a sectional view of a brake booster made according to the principals of the present invention.

FIG. 1 illustrates a brake booster 12 having a housing formed by joining a front shell 14 to a rear shell 16 through a locking arrangement 18. A partition arrangement 20 of the type disclosed in U.S. Pat. No. 3,897,718, engages a cylindrical body or hub 50 and with movable walls 22 and 24 separate the interior of the housing into front 26,26' and rear 28,28' chambers. The movable walls 22 and 24 correspondingly have a diaphragm 23,23' and a backing plate 25,25' that are fixed to the peripheral surface 52 of hub 50. Hub 50 has a stepped axial bore 54 which extends from a first end 56 located in the front chamber 26 to a second end 58 which passes through the rear shell 16 and is located in a surrounding environment. Hub 50 has a first series of passageways 60,60' through which the front chambers 26,26' are permanently connected to each other upstream of a valve seat 62 and a second series of passageways 61,61' through which the rear chambers 28,28' are selectively connected to each other downstream of vacuum seat 62. A control valve 70, of the type disclosed in U.S. Pat. No. 4,953,446, has a plunger 72 located on bearing surface 74 of hub 50, a poppet assembly 76 retained in the stepped axial bore 54 by sleeve 78 and a push rod 80. The bearing surface 74 is concentric with and holds plunger 72 in an aligned axial position within the stepped axial bore 54.

Figure 6:
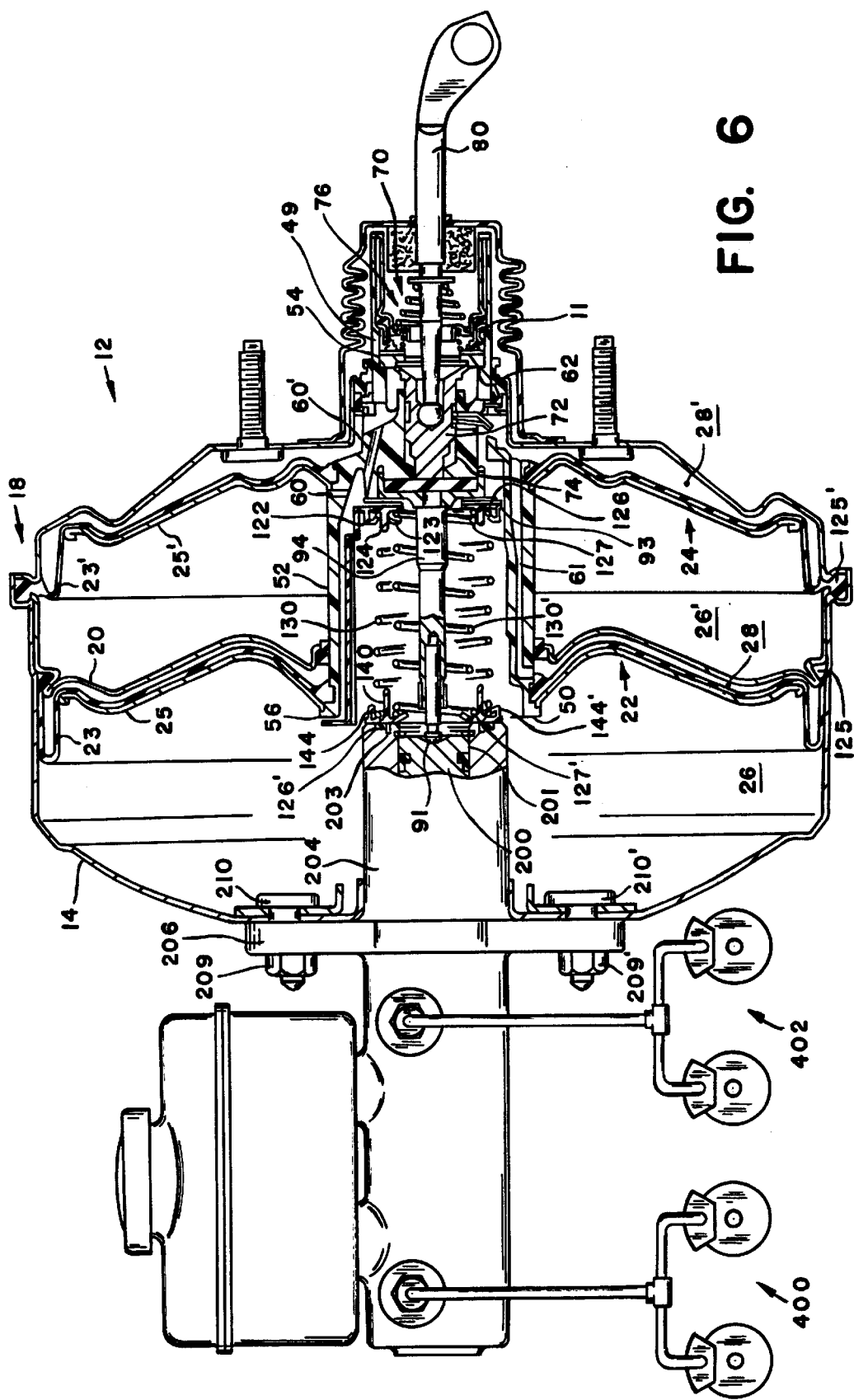
FIG. 6 is schematic illustration of a brake system with a master cylinder attached to the brake booster of FIG. 1.

The stepped axial bore 54, as best shown in FIGS. 1, 3 and 6 is further characterized by a plurality of arcuate slots 82,82', . . . $82^n$ located in the peripheral surface of stepped axial bore 54. The plurality of arcuate slots 82,82', . . . $82^n$ extend from the first end 56 to a face 75 adjacent bearing surface 74 of hub 50. The plurality of arcuate slots 82, 82', . . . $82^n$ are identical and as shown in FIG. 3 by a central radial rib or wall 86. The hub 50 includes a plurality of arcuate lips 88,88', . . . $88^n$ on the interior surface of hub 50 which cover a portion of the arcuate slots 82,82', . . . $82^n$. The central radial rib or wall 86 along with the plurality of arcuate lips 88,88', . . . $88^n$ define a plurality of locking surfaces or arcs 83,83', . . . $83^n$ within the stepped axial bore 54.

A plate 93 located in the stepped axial bore 54 engages face 75 on hub 50 and with retainer 100 holds a cup 92 of the output push rod 94 in a annular groove 90 of hub 50. The annular groove 90 assists in holding shaft 91 in axial alignment with the stepped axial bore 54. In addition, cup 92 also carries a reaction member 96 that is positioned adjacent face 75'. When brake booster 12 is in operation, reaction member 96 receives an operational force from hub 50 that is communicated into the output push rod 94.

The retainer 100 as shown in a perspective view in FIG. 2 and installed in hub 50 in FIGS. 1 and 3, has a base 102 with an irregular peripheral surface 101, an axial opening 104 through the base 102 and a plurality of axial legs 106, 106', . . . $106^n$ which extend from the base 102. The plurality of axial legs 106, 106', . . . $106^n$ are joined together by a ring-flange 103 to define a rigid structure. Each of the plurality of legs 106, 106', . . . $106^n$ is identical and have a T shape defined by a central rib 116 with first 118 and second 120 arms extending therefrom. The first 118 and second 120 arms, which are designed to flex about the central rib 116, have a fixed width which is greater than the width of locking surfaces or arc 83,83', . . . $83^n$ defined in the arcuate slots 82,82', . . . $82^n$ in hub 50. The plurality of legs 106, 106', . . . $106^n$ are correspondingly located in the plurality of arcuate slot 82,82', . . . $82^n$ along the axis of the stepped bore 54. The first arm of each leg tangentially engages the central rib or wall 86 while the second arm is located between a lip and side of a slot. Since the width of the first 118 and second 120 arms is greater that the width of a corresponding locking surface 83 frictional resistance occurs, the arms 118 and 120 flex to hold the legs 106, 106', . . . $106^n$ of the retainer 100 are pushed into the stepped axial bore 54. The base 102 engages plate 93 which in turn contacts head 92 of the output push rod 94 to hold shaft 91 which extends through to the axial opening 104 in axial alignment with the axis of the stepped axial bore 54. The base 102 further has an annular ring 124 concentrically spaced from opening 104 and a plurality of hooks or tabs 122, 122' . . . $122^n$ concentrically spaced from the annular ring 124. The plurality of hooks or tabs 122, 122' . . . $122^n$ engage and hold a first coil 126 of a first return spring 130 of spring arrangement 129 against base 102.

The retainer 100 further includes an end cap 136 shown in FIGS. 4 and 5 as having a base 138 with an annular projection or ring 140 concentrically spaced from an opening 142 and a plurality of hooks or tabs 144, 144' . . . $144^n$ concentrically spaced from the annular projection or ring 140 which engage a second coil 126' of return spring 130 to assist in holding a second return spring 130' between base 138 and base 102. As shown, base 102 also includes a second plurality of hooks or tabs 123, 123', . . . $123^n$ which engage a first coil 127 of the second return spring 130' between base 138 and base 102. Base 138 further includes a tapered flange 146 leading into opening 142, the slope of the tapered flange 146 provides a guide for end 91 of push rod 94 with respect to piston 200 located in master cylinder 202, see FIG. 6. Base 138 includes an aligning rib 150 that is located in a groove 203 in housing 204 of master cylinder 202. Flange 206 of housing 204 is connected to the front shell 14 by mounting bolts 210,210' such that the bore 201 in master cylinder 202 is axially aligned with the stepped axial bore 54 while locating rib 150 in groove 203 along with rings 124,140 keep springs 130,130' spaced apart.

Method of Assembly

As is common with a tandem brake booster 12 of the type illustrated in FIG. 1, various components are pre-assembled and in accordance with the present invention the return spring 130,130' are assembled with retainer 100 in the following manner. The first return spring 130 is pushed onto base 102 such that hooks or tabs 122, 122' . . . $122^n$ engage the first coil 126 and retain the first coil 126 against the base 102. The end 127 of the second return spring 130' is place against base 102 and now end cap 136 is pushed onto the return springs 130, 130' such that hooks or tabs 144, 144' . . . $144^n$ engage the second coil 126' to hold the second coil 126 against base 138 and at the same time hooks or tabs 123, 123' . . . $123^n$ engage a first coil 127 of the second return 130' to cage the second return spring 130' between base 138 and base 102.

In the assembly of brake booster 12, the first 22 and second 24 walls are connected to cylindrical body or hub 50 and the control valve 70 retained in the axial stepped bore 54. The cup 92 of output push rod 94 is located in groove 90 such that shaft 91 is aligned along the axis of the stepped axial bore 54. Plate 93 is inserted into the stepped axial bore 54 such that the passageways in hub 50 are not blocked and the sub-assembly of retainer 100 and return spring 130,130' thereafter inserted into the stepped axial bore 54. The offset 111,111' . . . $111^n$ of legs 106, 106', . . . $106^n$ from base 102 allows for alignment of branches 112 and 114 to be inserted into slots 82,82' . . . $82^n$ such that arm 118 engages rib or wall 86 and arm 120 engages the sides 81. Since the arcuate width of arms 118 and 120 is greater than a corresponding locking arc 83,83' . . . $83^n$ friction occurs as retainer 100 is pushed into the stepped axial bore 54. When base 102 engages face 75, plate 93 and cup 92 will be located in the stepped axial bore 54 such that reaction member 96 is adjacent face 75' of bearing surface 74 and shaft 91 is in axial alignment with the stepped axial bore 54. In this assembly, the retainer 100 with the return springs 130,130' are completely located in the stepped axial bore 54. Thereafter, the cylindrical body 49 of hub 50 is passed through bearing 11 on the rear shell 12 and bead 125 respectively positioned to the front shell 16 by partition 20 and bead 125' secured to the front shell 14 and rear shell 16 by the locking arrangement 18 to complete the assembly of the brake booster 12. This brake booster 12 is fully assembled and can be transported to another location as the return spring arrangement 129 and output push rod 94 are completely retained within the stepped axial bore 54 of the hub 50 by retainer 100 and as a result they will not be lost or mis-alinged when later joined with a master cylinder.

The brake booster 12 when presented at another location can be joined to an appropriate master cylinder 202 in the following manner.

After the end 91 of shaft 93 of the output push rod 94 is adjusted to the stroke of the pistons 200 of the master 202, housing 204 is inserted in opening 15 in the front shell 14. The flange 206 on housing 204 is aligned with mounting bolts 210,210' and housing 204 moves into the front chamber 26 and encounters rib 150 on end cap 136. Tapered flange 146 on end cap 36 acts as a guide for end 91 on shaft 94 and further movement of housing 204 into chamber 26 brings aligning rib 150 into groove 203 on housing 204 such that the return springs 130,130' and bore 201 in the master cylinder 202 are aligned with the stepped axial bore 54. When nuts 209,209' are tightened on bolts 210,210' flange 206 is brought into engagement with the front shell 14 and the return spring 130,130' compressed to position the wall 22,24 in a rest position to complete assembly of the booster assembly as illustrated in FIG. 6.

Mode of Operation

In response to an input force applied to input rod 80, plunger 72 moves to allow poppet member 76 to engage seat 54 and terminate communication between the front chambers 26,26' to the rear chambers 28,28' through the stepped axial bore 54. Further movement of plunger 72 moves face 73 away from the poppet member 76 to allow air from the surrounding environment to be communicated to the rear chambers 28,28' by way of passageways 61,61' to create a pressure differential across walls 22,24. This pressure differential acts on walls 22,24 to develop an operational force that is communicated through hub 50 into reaction member 96. After overcoming the force of return spring 130,130', the operational force moves output rod 94 which in turn moves pistons 200 in the master cylinder 202 to pressurize fluid in the master cylinder 202. The fluid pressurized by the master cylinder pistons 200 is communicated to the wheel brakes 400,402 to effect a corresponding brake application.

I claim:

1. A brake booster having a control valve located in a axial bore of a movable wall for communicating a first chamber with a second chamber in a first mode of operation and communicating said second chamber with a surrounding environment to create a pressure differential across said movable wall which separates said first chamber from said second chamber in a second mode of operation, a reaction member carried by said movable wall communicates an operational force created by said pressure differential into an output push rod, said output push rod after overcoming a return spring moving to provide pistons in a master cylinder with a corresponding operational force to develop pressurized fluid which is supplied to wheel brakes to effect a brake application, said brake booster being characterized by a retainer having a base with an axial opening and a plurality of axial legs which extend from the base, said base being located in said axial bore with a shaft of said output push rod passing through said axial opening while said plurality of axial legs frictionally engaging said hub to position said base in said axial bore such that a head of said output push rod is located adjacent said reaction member.

2. The brake booster as recited in claim 1 wherein said hub is characterized by a plurality of arcuate and axial slots located on the peripheral surface of said axial bore, said plurality of arcuate and axial slots having at least a first slot located within said axial bore substantially opposite a second acruate and axial slot, said first slot receiving a first leg of said plurality of legs while said second slot receiving a second leg of said plurality of legs to align said base within said axial bore such that said shaft is located along the axis of said hub.

3. The brake booster as recited in claim 2 wherein said plurality of arcuate and axial slots are each further characterized by a side wall and a arcuate lip, said arcuate lip being concentric to said slot, said side wall and arcuate lip defining a locking surface within said axial bore.

4. The brake booster as recited in claim 3 wherein each of said first and second legs each is further defined by a rib with first and second arms which extending therefrom, said first and second arms defining a fixed width which is greater than said locking surface, said first arm engaging said side wall while said second arm engages arcuate lip to frictionally hold said leg within an arcuate and axial slot.

5. The brake booster as recited in claim 4 wherein said base is further characterized by a first plurality of hooks that engage and hold said return spring in said axial bore.

6. The brake booster as recited in claim 5 further characterized by a plate located between said base and head of said output push rod to provide for a uniform distribution of operational force to overcome said return spring and allow said shaft to move pistons associated with the master cylinder.

7. The brake booster as recited in claim 5 wherein said plate distributes spring forces to prevent pre-loading of the output push rod which could effect the operation of the master cylinder.

8. A brake booster having a first housing with an interior separated into at least a first chamber and a second chamber by a wall connected to a hub, said hub has a cylindrical body with a stepped axial bore that extends from a first end to a second end, a control valve located in said stepped axial bore for sequentially connecting said first chamber with said second chamber to provide for the equalization of fluid pressure therein in a first mode of operation and in response to an input signal defining a second mode of operation where communication between said first and second chambers is interrupted while initiating communication between said second chamber and a surrounding environment to allow air to enter said second chamber and create a pressure differential across said wall, said pressure differential acting on said wall to develop an output force which acts on said hub to develop an operational force which is communicated through a reaction member into an output push rod, said operational force, after overcoming a return spring, moving said output push rod which supplies pistons located in a master cylinder with an operational input to pressurize fluid in the master cylinder which is communicated to wheel brakes to effect a brake application, said brake booster being characterized by a retainer having a base with an axial opening and a plurality of axial legs which extend from the base, said base being located in said stepped axial bore with said output push rod passing through said axial opening while said plurality of legs resiliently engaging said hub to position said base in said stepped axial bore such that said output push rod is held in a position adjacent said reaction member.

9. The brake booster as recited in claim 8 wherein said hub is characterized by a plurality of arcuate slots located on the peripheral surface of said stepped axial bore which receive said plurality of legs to aligning said base within said stepped axial bore such that said output push rod is located along the axis of said hub.

10. The brake booster as recited in claim 9 wherein said retainer is further characterized by a ring-flange connected to said plurality of legs to define a rigid structure.

11. The brake booster as recited in claim 10 wherein each of said plurality of axial arcuate slots is further characterized by a side wall and a concentric arcuate lip, said side wall and arcuate lips defining a locking surface within said stepped axial bore.

12. The brake booster as recited in claim 11 wherein said each of said plurality of legs each is further defined by central rib with first and second arms extending therefrom, said first and second arms defining a fixed width which is greater than said locking surface, said first arm engaging said side wall while said second arm engages said arcuate lip to frictionally hold a leg within one of said axial arcuate grooves.

13. The brake booster as recited in claim 12 wherein said base is further characterized by a first plurality of tabs that engage and hold said return spring in said stepped axial bore.

14. The brake booster as recited in claim 13 further characterized by a plate located between said base and a head of said output push rod to provide for a uniform distribution of said operational force into said return spring.

15. The brake booster as recited in claim 14 wherein said retainer is further characterized by an end cap having a second plurality of tabs that engage said return spring and a projection, said projection engaging said master cylinder to axially align said return spring within said stepped axial bore.

16. The brake booster as recited in claim 15 wherein said end cap is further characterized by guides that aid in aligning said projection with a seat on said master cylinder.

* * * * *